(12) United States Patent
Ma et al.

(10) Patent No.: US 11,142,675 B2
(45) Date of Patent: Oct. 12, 2021

(54) HEAT EXCHANGING THERMAL LIQUID CONTAINER

(71) Applicants: Hongbin Ma, Columbia, MO (US); Michael Merwin, Columbia, MO (US); Hao Bai, Columbia, MO (US); Xiaoqin Liu, Columbia, MO (US); Robert Riegler, Pacific, MO (US); Chris Vincent, Columbia, MO (US)

(72) Inventors: Hongbin Ma, Columbia, MO (US); Michael Merwin, Columbia, MO (US); Hao Bai, Columbia, MO (US); Xiaoqin Liu, Columbia, MO (US); Robert Riegler, Pacific, MO (US); Chris Vincent, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 147 days.

(21) Appl. No.: 15/803,977

(22) Filed: Nov. 6, 2017

(65) Prior Publication Data

US 2018/0171197 A1    Jun. 21, 2018

Related U.S. Application Data

(60) Provisional application No. 62/436,855, filed on Dec. 20, 2016, provisional application No. 62/491,568, filed on Apr. 28, 2017.

(51) Int. Cl.
*C09K 5/06* (2006.01)
*B65D 81/38* (2006.01)
(Continued)

(52) U.S. Cl.
CPC .............. *C09K 5/06* (2013.01); *B65D 43/022* (2013.01); *B65D 43/0222* (2013.01);
(Continued)

(58) Field of Classification Search
CPC ............... F25D 2303/0831; F25D 3/08; B65D 2543/00046; B65D 81/3872
See application file for complete search history.

(56) References Cited

U.S. PATENT DOCUMENTS

| 83,755 A | 11/1868 | Bass |
| 2,876,634 A | 3/1959 | Zimmerman et al. |

(Continued)

OTHER PUBLICATIONS

International Search Report from corresponding International Application No. PCT/US2017/67239, dated Mar. 8, 2018.

*Primary Examiner* — Henry T Crenshaw
(74) *Attorney, Agent, or Firm* — Sandberg Phoenix & von Gontard P.C.

(57) ABSTRACT

A heat exchanging thermal liquid container system that comprises a main body at least partially defining a liquid reservoir structured and operable to retain a liquid, and a phase change material (PCM) liner comprising a PCM liner PCM having a selected melting temperature, and/or at least one PCM pod. Each of the at least one PCM pod(s) comprising a respective PCM pod PCM having a respective selected melting temperature. Wherein the PCM liner and/or the at least one PCM pod are disposable within the liquid reservoir such that when a liquid is disposed within the liquid reservoir the liquid will contact at least one of the PCM liner and the at least one PCM pod such that thermal energy can be exchanged between the liquid and the respective at least one of the PCM liner PCM and the at least one PCM pod PCM.

6 Claims, 9 Drawing Sheets (51) Int. Cl.
  *F28D 20/02* (2006.01)
  *A47J 41/00* (2006.01)
  *F28D 20/00* (2006.01)
  *B65D 51/24* (2006.01)
  *B65D 43/02* (2006.01)

(52) U.S. Cl.
  CPC ......... *B65D 51/24* (2013.01); *B65D 81/3841* (2013.01); *B65D 81/3844* (2013.01); *B65D 81/3846* (2013.01); *B65D 81/3867* (2013.01); *B65D 81/3869* (2013.01); *B65D 81/3872* (2013.01); *F28D 20/021* (2013.01); *A47J 41/0044* (2013.01); *B65D 2543/00046* (2013.01); *F25D 2303/084* (2013.01); *F28D 20/0034* (2013.01); *F28D 20/02* (2013.01); *F28D 2020/0004* (2013.01)

(56) References Cited

U.S. PATENT DOCUMENTS

| | | |
|---|---|---|
| 3,025,677 A | 9/1965 | Stoner |
| 3,603,106 A | 9/1971 | Ryan |
| 3,807,194 A | 4/1974 | Bond |
| 3,995,445 A | 12/1976 | Huskins |
| 4,638,645 A | 1/1987 | Simila |
| 6,151,910 A * | 11/2000 | Hazen ................ B65D 81/3876 220/495.03 |
| 6,634,417 B1 | 10/2003 | Kolowich |
| 7,934,537 B2 | 5/2011 | Kolowich |
| 8,061,158 B2 * | 11/2011 | Roth ........................ F25D 3/08 62/457.3 |
| 8,672,164 B2 * | 3/2014 | Honeyghan ............ A47G 19/22 220/254.3 |
| 9,181,015 B2 * | 11/2015 | Booska ............... A47G 19/2266 |
| 9,497,987 B2 * | 11/2016 | Jossem ...................... A23L 3/36 |
| 2009/0283533 A1 * | 11/2009 | Hemminger ......... B65D 43/022 220/592.17 |
| 2011/0005240 A1 | 1/2011 | Chapa |
| 2011/0220674 A1 * | 9/2011 | Honeyghan ............ A47G 19/22 220/849 |
| 2011/0315783 A1 * | 12/2011 | Baker ...................... B01L 7/52 236/3 |
| 2014/0331711 A1 | 11/2014 | Blezard et al. |
| 2015/0136618 A1 | 5/2015 | Patel et al. |
| 2016/0045047 A1 | 2/2016 | Healy |
| 2016/0215194 A1 | 7/2016 | Narine et al. |
| 2017/0275065 A1 * | 9/2017 | Santos, III ......... B65D 51/1611 |

* cited by examiner

HEAT EXCHANGING THERMAL LIQUID CONTAINER

CROSS-REFERENCE TO RELATED APPLICATIONS

This application claims the benefit of U.S. Provisional Application No. 62/436,855, filed Dec. 20, 2016, and of U.S. Provisional Application No. 62/491,568, filed on Apr. 28, 2017.

FIELD

The present teachings relate to thermally insulating containers, and more particularly to a heat exchanging thermal liquid container.

BACKGROUND

The statements in this section merely provide background information related to the present disclosure and may not constitute prior art.

There are many thermal insulating beverage containers on the market today. Such containers are typically structured and operable to minimize (i.e., slow down) the rejection and/or absorption of heat from the liquid beverage disposed within the container into or by the ambient environment. That is, such containers are structured and operable to slow down the cooling and/or warming of the liquid beverage by providing an insulating barrier between the hot or cold liquid and the ambient environment such that the rejection of the thermal energy within liquid to the ambient environment, and/or the absorption of the thermal energy within liquid by the ambient environment is minimized. Such thermal insulating beverage containers are relatively thermally inefficient and do not maintain the liquid beverage at a desirable drinking temperature for an extended period of time. For hot beverages an example of the desired drinking temperature can be approximately 98° F. to 160° F. (approximately 37° C. to 71° C.). For cold beverages an example of the desired drinking temperature can be approximately 32° F. to 50° F. (approximately 0° C. to 10° C.).

Such known thermal insulating beverage containers are generally known to maintain the respective liquid beverage within the desired drinking temperature range only for a short period of time. For example, if a hot beverage is poured into a paper cup without any insulation, the temperature of the beverage may remain within the desired drinking temperature range for only approximately 5-30 minutes. Or, for example, if a hot liquid is poured into a known insulated beverage container, e.g., a double-walled vacuum tumbler, the beverage may remain the desired drinking temperature range for only approximately 30-90 minutes.

Various related technology patents are US patents: U.S. Pat. Nos. 2,876,634; 3,205,677; 3,603,106; 3,807,194; 3,995,445; 4,638,645; 6,634,417; 7,934,537; and US0083755. However, the manufacturing process disclosed in such patents has limited application.

SUMMARY

In various embodiments, the present disclosure provides a heat exchanging thermal liquid container system that can be used to quickly cool down a temperature of a hot liquid (e.g., a hot consumable beverage) to be within a desired temperature range (e.g., a desired drinking temperature range) with a more uniform temperature throughout the liquid, and maintain the liquid at or near the desired temperature range for an extended period of time (e.g., for approximately 1 to 15 hours). For example, a desired drinking range can be approximately 98° F. to 160° F., 37° C. to 71° C. for hot beverages, and approximately 32° F. to 50° F., 0° C. to 10° C. for cold beverages.

Therefore, it is envisioned that in various instances, a hot liquid (e.g., a consumable beverage) that exceeds an upper limit of the desired temperature (e.g., exceeds 160° F.) can be poured into the heat exchanging thermal liquid container system of the present disclosure and be cooled to a temperature within the desired temperature range very quickly. For example, a consumable beverage that exceeds an upper limit of a drinking temperature range (e.g., exceeds 160° F.) can be poured into the heat exchanging thermal liquid container system of the present disclosure and be cooled to a temperature within the drinking temperature range very quickly, such that the liquid can be consumed shortly thereafter. For example, in various instances a hot consumable beverage that exceeds the drinking temperature can be consumed approximately 3 to 30 seconds after being poured into the heat exchanging thermal liquid container system of the present disclosure.

In operation, when the hot liquid is disposed within the heat exchanging thermal liquid container system of the present disclosure, a portion of the thermal energy of the liquid (e.g., a portion of the heat of the liquid) is quickly and efficiently transferred to, or absorbed by, a phase change material that is disposed within one or more reservoir, bladder, compartment, cavity, container, housing, or other hollow structure of the heat exchanging thermal liquid container system of the present disclosure, thereby quickly reducing the temperature of the liquid to be within a desire temperature range (e.g., a temperature within the range of approximately 98° F. to 160° F., 37° C. to 71° C.). Moreover, the heat (e.g., thermal energy) absorbed by the phase change material can be stored by the phase change material, and when the temperature of the liquid begins to decrease (e.g., the temperature of the liquid decreases below a melting temperature of the phase change material), the thermal energy stored in the phase change material can be transferred, or rejected, back into the liquid to maintain the liquid within the desired temperature range.

In various embodiments, the heat exchanging thermal liquid container system of the present disclosure can be a modular system such that the container system can be easily assembled and disassembly, whereby the container system can be user configured to keep the liquid (e.g., the beverage) at generally any desired temperature.

In various embodiments, the present disclosure provides a heat exchanging thermal liquid container system, wherein the system comprises a main body at least partially defining a liquid reservoir structured and operable to retain a liquid, and at least one of a phase change material (PCM) liner comprising a PCM liner PCM having a selected melting temperature, and at least one PCM pod. Each of the at least one PCM pod(s) comprises a respective PCM pod PCM having a respective selected melting temperature. The at least one of the PCM liner and the at least one PCM pod are disposable within the liquid reservoir such that when a liquid is disposed within the liquid reservoir the liquid will contact at least one of the at least one of the PCM liner and the at least one PCM pod such that thermal energy can be exchanged between the liquid and the respective at least one of the PCM liner PCM and the at least one PCM pod PCM.

In various other embodiments, the present disclosure provides a heat exchanging thermal liquid container system, wherein the system comprises a main body at least partially defining a liquid reservoir structured and operable to retain a liquid, and an upper PCM unit that is removably connectable to the main body. The upper PCM unit comprises an upper unit base, an upper unit PCM pod disposed adjacent an underside of the upper unit base, and an upper unit PCM disposed within the upper unit PCM pod, wherein the upper unit PCM has a first melting temperature. The system additionally comprises a lower PCM unit that is removably connectable to the main body. The lower PCM unit comprises an lower unit base, an lower unit PCM pod disposed adjacent a top side of the lower unit base, and a lower unit PCM disposed within the lower unit PCM pod, wherein the lower unit PCM has a second melting temperature. In various instances the first melting temperature can be the same as the second melting temperature, while in other instances the first melting temperature can be different than the second melting temperature.

In yet other embodiments, the present disclosure provides a method for filling a cavity of a heat exchanging thermal liquid container system with a phase change material (PCM), wherein the method comprises providing a heat exchanging thermal liquid container system, wherein the heat exchanging thermal liquid container system comprises a main body having at least one sidewall and a bottom that define a PCM liner receptacle, a PCM liner disposed within and connected to the main body, the PCM liner comprising an interior hollow space that defines a PCM cavity, a PCM charging port extending though the one of the main body sidewall and bottom into the hollow PCM liner and fluidly connecting the interior of the hollow PCM liner with a ambient environment, and a charging port plug structured and operable to disposed within the charging port. The method further comprises at least partially filling the PCM cavity with a selected PCM, via the PCM charging port, and then disposing the charging port plug within the charging port such that the charging port is sealed in a leak-tight manner.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
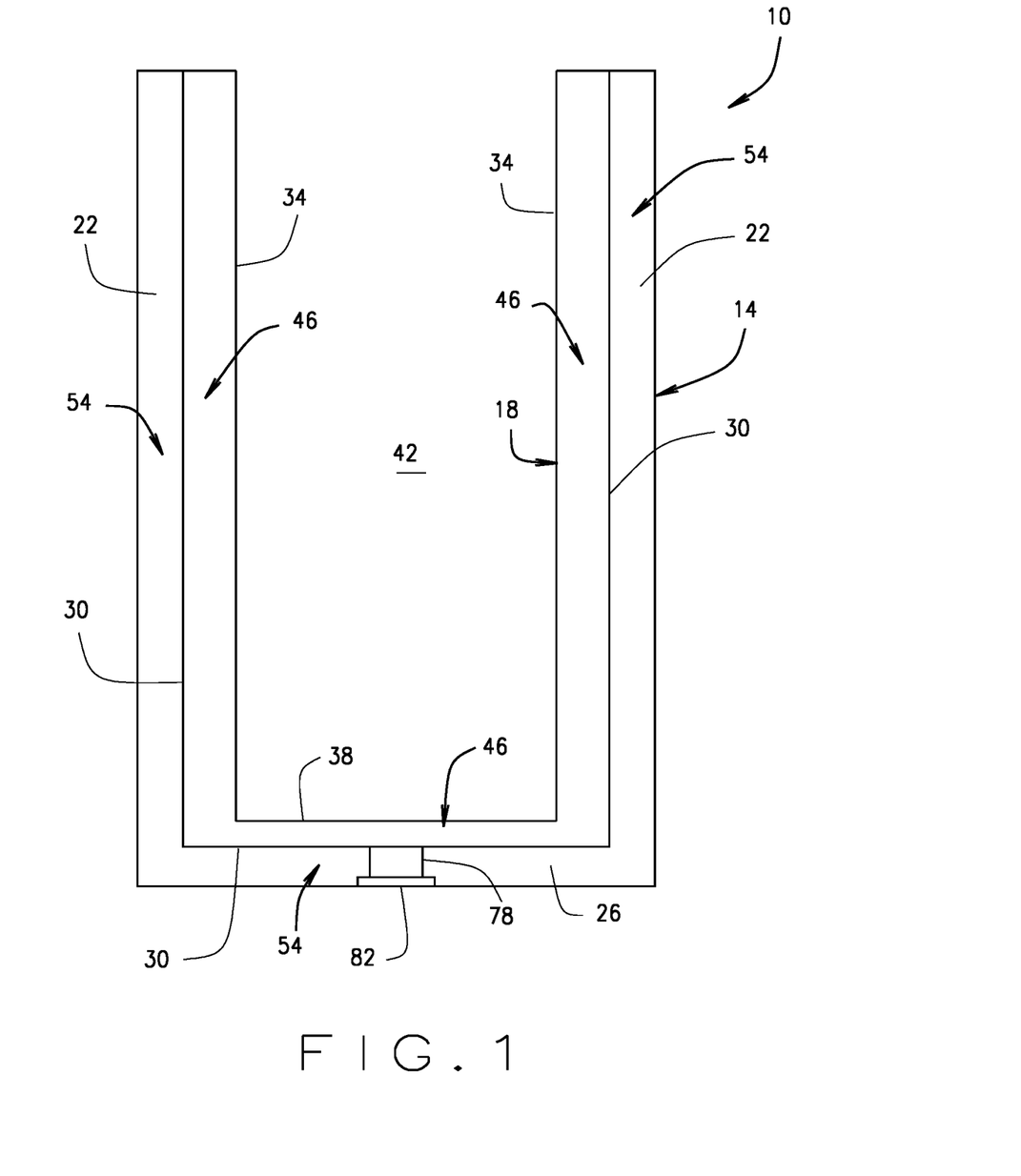
FIG. 1 is a longitudinal cross-sectional view of a heat exchanging thermal liquid container system, in accordance with various embodiments of the present disclosure.

Referring now to FIG. 1, in various embodiments the present disclosure provides a heat exchanging thermal liquid container system 10 that can be used to quickly cool down and/or maintain a temperature of a liquid to be within a desired temperature range with a more uniform temperature throughout the liquid, and maintain the liquid at or near the desired temperature range for an extended period of time (e.g., for approximately 1 to 15 hours). It should be understood that although the container system 10 of the present disclosure can be any container system used to quickly cool down and/or maintain the temperature of any liquid, and remain within the scope of the present disclosure, for simplicity and clarity the container system 10 will be illustrated and described herein as a beverage container system 10 used to quickly cool down and/or maintain the temperature of a liquid beverage to be within a desired drinking temperature range (e.g., approximately 98° F. to 160° F., 37° C. to 71° C. for hot beverages, and approximately 32° F. to 50° F., 0° C. to 10° C. for cold beverages) with a more uniform temperature throughout the beverage, and maintain the beverage at or near the desired drinking temperature range for an extended period of time (e.g., for approximately 1 to 15 hours).

In various embodiments, the container system 10 can comprises a main body 14 and a phase change material (PCM) liner 18 disposed within the main body 14. More specifically, the main body 14 is structured and formed to have at least one sidewall 22 and a bottom 26 that define a PCM liner receptacle 30, and the PCM liner 18 is structured and formed to fit within and be disposed within the PCM liner receptacle 30. The PCM liner 18 is a hollow body liner having at least one sidewall 34, and in various instances a bottom 38, that defines a liquid or beverage reservoir 42 suitable for retaining various hot and/or cold liquids and beverages (e.g., coffee, tea, hot chocolate, soda, beer, water, etc.). The main body 14 and the PCM liner 18 sidewall(s) 22 and 34 can be structured and formed to have generally any radial (or lateral) cross-sectional shape and to define the beverage reservoir 42 having generally any lateral cross-sectional shape. For example, in various embodiments, the main body 14 and the PCM liner 18 sidewall(s) 22 and 34 can be structured and formed to have a cylindrical, square, oval, rectangular, triangular, etc., radial (or lateral) cross-sectional shape, and the beverage reservoir 42 can have any similar or dissimilar cylindrical, square, oval, rectangular, triangular, etc., radial (or lateral) cross-sectional shape. In various instances the PCM liner 18 can be fixedly connected to the main body and disposed within the PCM liner receptacle 30. In various alternative instances, the PCM liner 18 can be a removable module removably disposed within the PCM liner receptacle 30.

As described above, the PCM liner 18 is a hollow body liner. More particularly, the PCM liner 18 is structured and formed to include an interior hollow space that defines a PCM cavity 46 that can be at least partially filled with any desired phase change material (PCM) 50 (as exemplarily illustrated in FIG. 3). It is envisioned that the PCM liner 18 can be any one or more reservoir, bladder, compartment, cavity, container, housing, or other hollow structure that can be at least partially filled with the PCM 50. In various embodiments, the PCM liner sidewall(s) 34 are structured and formed to define the PCM cavity 46 and the PCM bottom 38 is not, such that only the PCM liner sidewall(s) is/are fillable with the PCM 50. While in other embodiments, the PCM liner sidewall(s) 34 and bottom 38 are structured and formed to define the PCM cavity 46 and are fillable with the PCM 50. Moreover, the PCM liner 18 is structure and formed to be airtight and leak-tight such that any beverage (or other liquid) that may be disposed within beverage reservoir 42 will not leak, migrate or otherwise enter the PCM cavity 46, and similarly such that the PCM 50 will not leak, migrate or otherwise enter the beverage reservoir 42. The PCM liner 18 can be fabricated of any material suitable for retaining hot and/or cold beverages (or liquids), e.g., beverages (or liquids) ranging from approximately 20° F. to 200° F., approximately −7° C. to 94° C. For example, it is envisioned that the PCM liner 18 can be fabricated from stainless steel, glass, ceramics, suitable plastics, etc.

Figure 3:
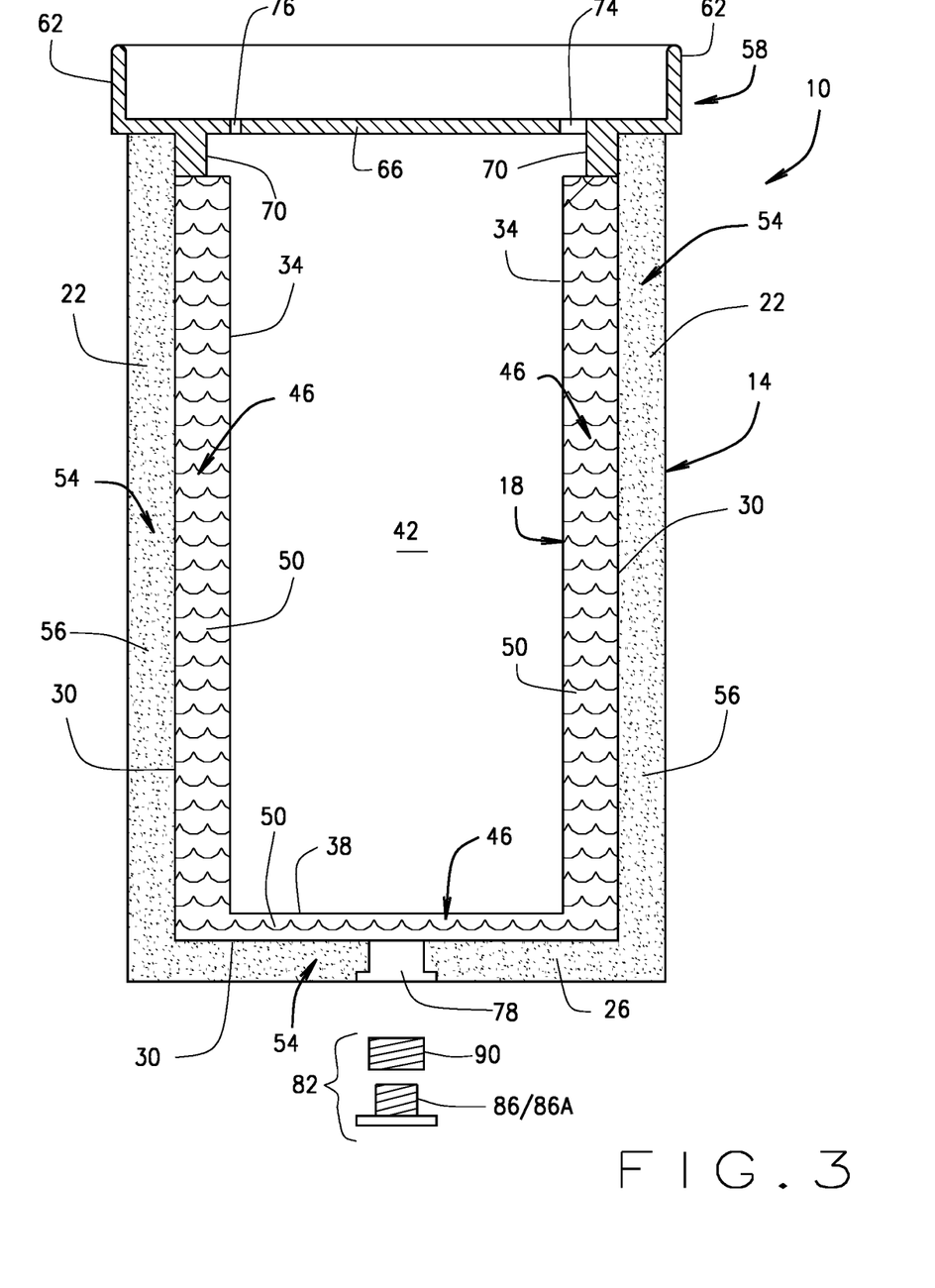
FIG. 3 is a longitudinal cross-sectional view of the heat exchanging thermal liquid container system shown in FIGS. 1 and 2 illustrating an exploded view of a plug assembly and charging port of the container, in accordance with various embodiments of the present disclosure.

In various embodiments, the main body 14 can be a hollow body structured and formed to include an interior hollow space that defines an insulation cavity 54 that can be at least partially filled with insulation 56 (as exemplarily illustrated in FIG. 3). The insulation 56 can be any suitable insulation. For example, in various embodiments the insulation cavity 54 can be at least partially filled with any desired insulating material, gas or liquid, or can be absent a material, gas or liquid. For example, in various instances, the insulation cavity 54 can be absent or void of air, or mostly absent or void of air (e.g., a vacuum or reduced air), or in other instances the insulation cavity 54 can be at least partially filled with fiberglass, polystyrene, polyurethane foam, cellulose, mineral wool, or any other presently and future known insulation material. In such embodiments, the insulating function provided by the insulation 56 within insulation cavity 54 of the main body 14 will reduce and retard the rejection of thermal energy (e.g., heat loss) from the PCM 50 to the ambient environment such that the PCM will remain at its respective phase change temperature (also referred to herein as the melting temperature) for an extended period of time, as described below.

In operation, when the PCM liner 18 is at least partially filled with a selected PCM 50 and a beverage, e.g., a hot beverage such as coffee, is poured into or disposed within the beverage reservoir 42, the thermal energy (i.e., the heat) from hot beverage is transferred (i.e., rejected to and absorbed by) the PCM 50, causing the PCM 50 to change phase from a substantially solid form to a liquid form, whereby the PCM 50 stores the thermal energy (i.e., the heat). Note the PCM 50 is selected to have melting temperature that is within a desired drinking temperature range for the respective beverage. Thereafter, when the temperature of the beverage changes, e.g., cools down, such that the temperature of the beverage in the beverage reservoir 42 is reduced to a temperature that is below the desired drinking temperature range, and hence, below the melting temperature of PCM 50, the PCM 50 releases (i.e., rejects) the thermal energy (i.e., the heat) stored in the PCM 50 back into liquid. That is, the heat stored in the PCM 50 is rejected to and absorbed by the beverage, thereby heating the beverage or maintaining the beverage within a particular desired drinking temperature range, or at an approximately steady or constant temperature, during which the PCM 50 gradually changes from the liquid form back to the solid form.

In this way, a hot beverage disposed within the beverage reservoir 42 can be quickly cooled down to be within the desired drinking, temperature range (e.g., a temperature within the range of approximately 98° F. to 160° F., 37° C. to 71° C.), and maintained within the desired drinking temperature range for many hours (e.g., approximately 1 to 15 hours). For example, theoretical analysis and numerical modeling demonstrated that when hot coffee having a temperature of approximately 194° F. (approximately 90° C.) is poured into the beverage reservoir 42 of the system 10, the coffee can be cooled down to approximately 149° F. (approximately 65° C.) within approximately 3 seconds, and that the temperature of the coffee can be maintained within the desired drinking temperature range for an extended period of time, e.g., approximately 1 to 15 hours.

In various embodiments, the heat exchanging thermal liquid container system 10 can additionally include a lid or cap assembly 58 that is removable engageable with the main body 14 and/or the PCM liner 18 to cover the top opening of the beverage reservoir 42. The lid assembly 58 is structured and operable to prevent and/or inhibit the beverage disposed within the beverage reservoir 42 from readily flowing or splashing out of the beverage reservoir 42, and to allow controlled dispensing of the beverage from the beverage reservoir 42.

Figure 4:
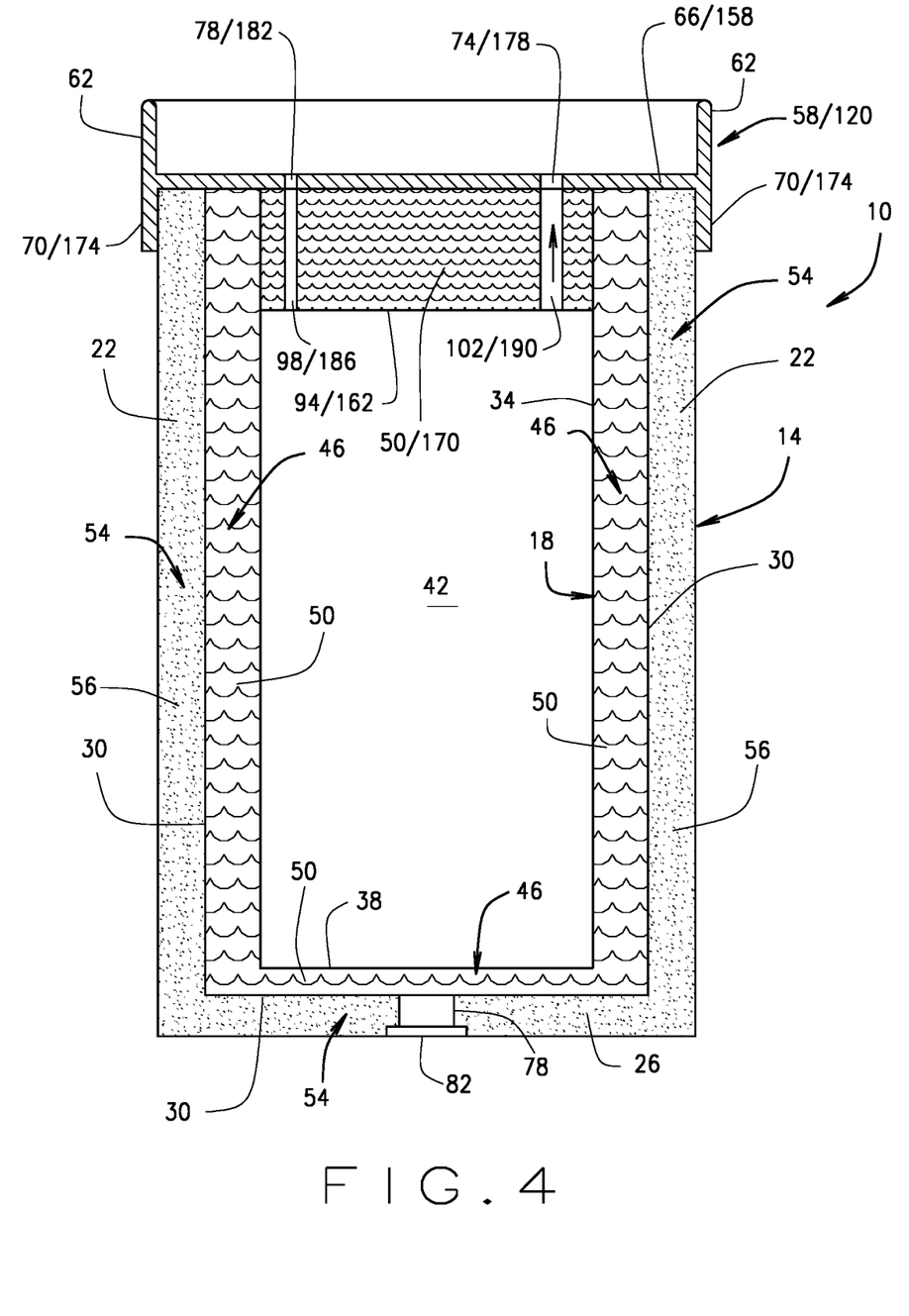
FIG. 4 is a longitudinal cross-sectional view of the heat exchanging thermal liquid container system shown in FIG. 3 including a PCM lid pod, in accordance with various embodiments of the present disclosure.

The lid assembly 58 generally comprises a perimeter lip or edge 62 that is formed around or connected to the perimeter of a base 66. In various embodiments, the lid assembly 58 additionally includes a connection or retention collar 70 that extends from a bottom side of the base 66 and is structured and operable to removably engage with the container body 14 and/or the PCM liner 18 in a substantially liquid-tight manner. For example, in various embodiments, the retention collar 70 can threadably and positively engage the body 14 and/or the PCM liner 18. Or, in other embodiments, the lid assembly 58 can comprise a seal or gasket, e.g., a rubber-like O-ring or any other type of liquid seal (not shown) disposed around or connected to an inner or outer face of the retention collar 70 such that the seal, and hence the retention collar 70, is removably frictionally and/or compressively engageable with the body 14 and/or the PCM liner 18. Although the retention collar 70 is exemplarily shown in FIG. 2 as removably engageable with the interior surface of body 14 and/or a top surface of the PCM liner 18, it is envisioned that the retention collar 70 can be removably engageable with the interior surface of only the body 14, or removably engageable with the interior surface of only the PCM liner 18, or removably engageable with the exterior surface of the body 14 (FIG. 4), or removably engageable with any combination thereof. The lid assembly 58 further includes a drinking hole 74 that extends through the base 66 such that the beverage within the beverage reservoir 42 can be controllably dispensed though the drinking hole 74 for consumption by a user. In various embodiments, the lid assembly 58 can still further include an air hole 76 that extends through the base 66 such that air can be drawn into the beverage reservoir 42 as the beverage is dispensed through the drinking hole 74, thereby providing a smooth flow of the beverage through the drinking hole 74.

Figure 2:
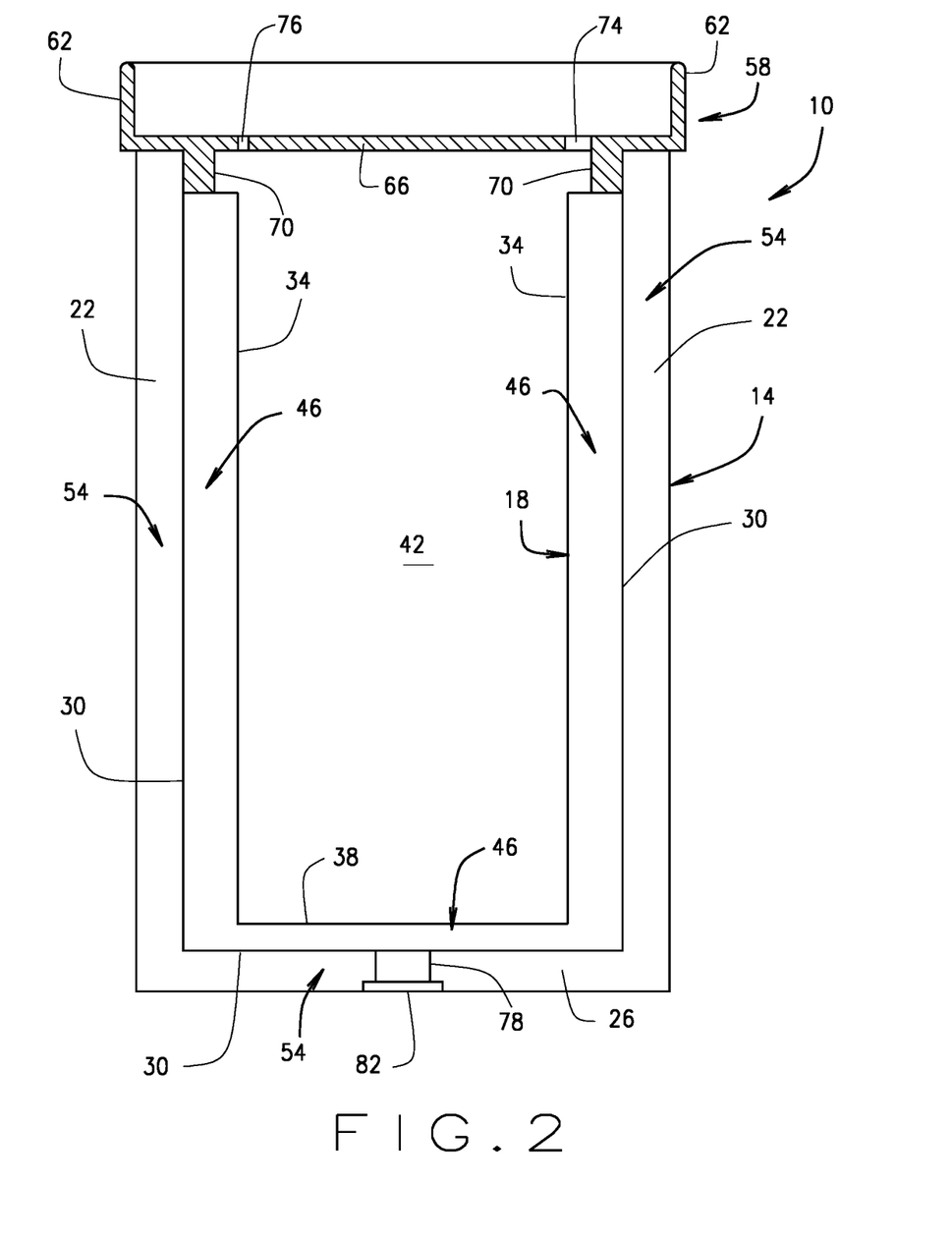
FIG. 2 is a longitudinal cross-sectional view of the heat exchanging thermal liquid container system shown in FIG. 1 including a lid, in accordance with various embodiments of the present disclosure.

Referring now to FIGS. 1, 2, and 3, as described above, the PCM liner 18 is structured and formed to include an interior hollow space that defines the PCM cavity 46 that can be at least partially filled with any desired phase change material (PCM) 50. Generally, a PCM is a substance with a high heat of fusion which, melting and solidifying at a certain temperature, is capable of storing and releasing large amounts of energy. Heat is absorbed or released when the material changes from solid to liquid and vice versa, thus, PCMs are often classified as latent heat storage (LHS) units. When PCMs reach the temperature at which they change phase (their melting temperature) they absorb large amounts of heat at an almost constant temperature. The PCM continues to absorb heat without a significant rise in temperature until all the material is transformed to the liquid phase. When the ambient temperature around a liquid material falls, the PCM solidifies, releasing its stored latent heat. A large number of PCMs are available in any required temperature range, e.g., from approximately 20° F. to 375° F. (approximately from −7° C. up to 19° C.). Many PCMs can store 5 to 14 times more heat per unit volume than conventional storage materials such as water, masonry or rock.

The PCM cavity 46 can be filled (or charged) with the PCM 50 via any suitable filling process. For example, as exemplarily illustrated in FIG. 3, in various embodiments the container system 10 can include a charging port 78 that is a hole, conduit or lumen extending through the main body bottom 26 (or alternatively through the main body sidewall) into the hollow interior of PCM liner receptacle 30 and fluidly connecting the interior of the hollow PCM liner with a ambient environment, and a stopper or plug assembly 82 that sealingly mates with and/or within the charging port 78. Although the charging port 78 is exemplarily illustrated in FIG. 3 as being located generally in the center of the bottoms 26 and 38 of the main body 14 and PCM liner receptacle 30, the charging port 78 can be located anywhere within the bottoms 26 and 38 of the main body 14 and PCM liner receptacle 30 and/or the sidewalls 22 and 34 of the main body 14 and PCM liner receptacle 30, and remain within the scope of the present disclosure. Accordingly, in various embodiments, the PCM 50, having a desired melting temperature, can be disposed, dispensed, injected, etc., through the charging port 78 and into the PCM cavity 46, such that the PCM cavity 46 is at least partially filled. Thereafter, the charging port 78 can be closed or plugged via the plug assembly 82 such that the charging port 78 is sealed in a leak-tight manner such that the PCM 50 cannot leak or otherwise escape from the PCM cavity 46. The plug assembly 82 can be any device, mechanism, or assembly suitable for sealing the charging port 78 such that the PCM 50 cannot leak or otherwise escape from the PCM cavity 46. For example, in various embodiments, the plug assembly 82 can comprise a small cylinder or plug 86 that is disposable in any manner, e.g., soldered, welded, glued, pressed, etc., within the charging port 78 to retain the PCM within the PCM cavity 46. In various alternative exemplary embodiments, the plug assembly 82 can comprise a threaded plug 86A and a threaded sleeve 90, wherein the threaded plug 86A is threadingly engageable within the threaded sleeve 90 such that the PCM 50 cannot leak or otherwise escape from the PCM cavity 46. The threaded sleeve 90 can be fixed within the charging port 78 in any suitable manner such that the PCM 50 cannot leak or otherwise escape from the PCM cavity 46, e.g., glued, welded, soldered, etc. and such that the threaded plug 86A can be threadingly engaged within the threaded sleeve 90 to seal the charging port 78.

Figure 5A:
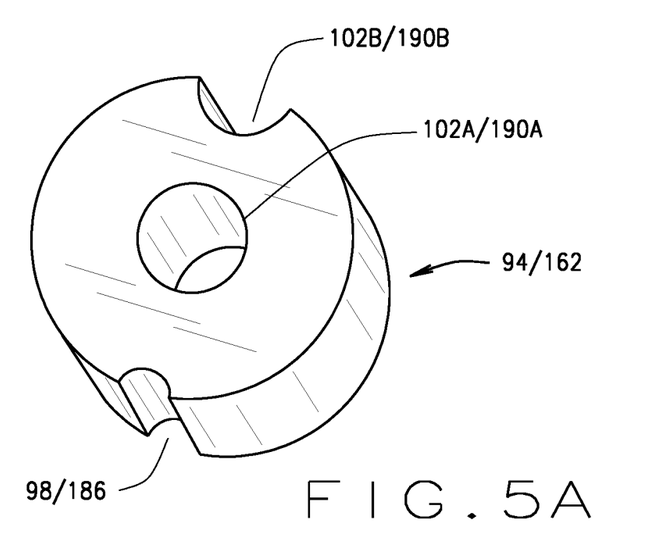
FIG. 5A is an isometric view of a lid PCM pod in accordance with various embodiments of the present disclosure.
Figure 5B:
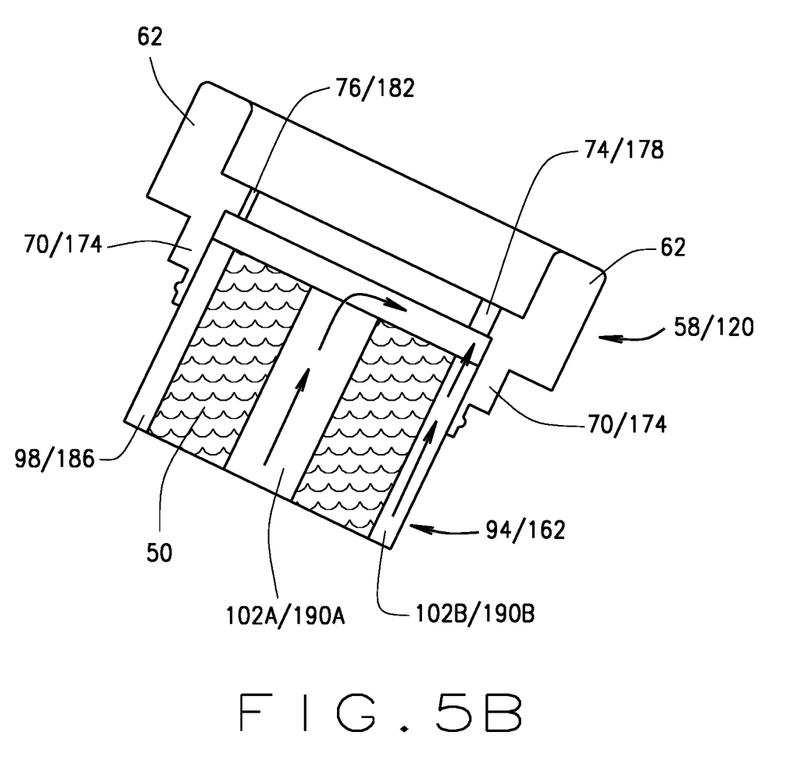
FIG. 5B is a longitudinal cross-sectional view of a lid of the heat exchanging thermal liquid container system having the lid PCM pod shown in FIG. 5A disposed therein, in accordance with various embodiments of the present disclosure.

Referring now to FIGS. 1, 2, 3 and 4, in various instances a bottom portion of the beverage, i.e., the portion of beverage that is nearer the bottom of the beverage reservoir 42, can cool at a different rate than the top portion of the beverage, i.e., the portion of beverage that is nearer the top of the beverage reservoir 42 (for example, the bottom portion can cool faster than the top portion). To address this, in various embodiments, the heat exchanging thermal liquid container system 10 can further comprise a lid PCM pod 94 that is fixedly or removably attached to, or extends from, or is disposed adjacent to an underside or bottom surface of the lid base 66, such that the lid PCM pod 94 can extend into the beverage within the beverage reservoir 42. It is envisioned that the lid pod 94 can be any one or more reservoir, bladder, compartment, cavity, container, housing, or other hollow structure that can be at least partially filled with the PCM 50. The lid PCM pod 94 is filled with a PCM 50 and comprises one or more air orifice 98 that fluidly connects with the air hole 76 in the base 66 of the lid assembly 58, and one or more liquid flow orifice 102 that fluidly connects to the drinking hole 74 in the base 66 of the lid assembly 58. It is envisioned that the PCM 50 within the lid PCM pod 94 can be the same PCM, or a different PCM, than the PCM 50 disposed within the PCM cavity 46 of the PCM liner receptacle 30, such that the PCM 50 within the lid PCM pod 94 has the same, or a different, melting temperature than the PCM 50 disposed within the PCM cavity 46 of the PCM liner receptacle 30. As exemplarily illustrated in FIGS. 5A and 5B, in various embodiments, the lid PCM pod 94 can have a primary liquid flow orifice, identified as 102A and at least one secondary liquid flow orifice, identified as 102B.

In operation, when a beverage, e.g., a hot beverage such as coffee, is disposed within the beverage reservoir 42, and the lid assembly 58 is attached to the main body 14 and/or the PCM liner 18 such that the lid PCM pod 94 extends into the beverage, the thermal energy (i.e., the heat) from hot beverage is transferred (i.e., rejected to and absorbed by) the PCM 50 within the lid PCM pod 94, causing the PCM 50 to change phase from a substantially solid form to a liquid form, whereby the PCM 50 stores the thermal energy (i.e., the heat). Note the PCM 50 is selected to have a melting temperature (also referred to herein as the phase change temperature) that is within a desired drinking temperature range for the respective beverage. Thereafter, when the temperature of the beverage changes, e.g., cools down, such that the temperature of the beverage in the beverage reservoir 42 is reduced to a temperature that is below the desired drinking temperature range, and hence, below the melting temperature of PCM 50 within the lid pod 94, the PCM 50 releases (i.e., rejects) the thermal energy (i.e., the heat) stored in the PCM 50 back into liquid. That is, the heat stored in the PCM 50 is rejected to and absorbed by the beverage, thereby heating the beverage or maintaining the beverage within a particular desired drinking temperature range, or at an approximately steady or constant temperature, (i.e., a temperature approximately equal to the melting temperature of the respective PCM 50), during which the PCM 50 gradually changes from the liquid form back to the solid form.

Additionally, once the thermal energy from hot beverage has been transferred to the PCM 50 within the lid PCM pod 94 (as described above), and the beverage is dispensed or consumed such that the lid PCM pod 94 no longer extends into the beverage when the container 10 is a normal upright resting position, as the beverage is dispensed or consumed, the beverage will flow through the liquid flow orifice 102 of the lid PCM pod 94 (as indicated by the arrows) and drinking hole 74 in the lid base 66. Accordingly, as the beverage flows through the liquid flow orifice 102, the thermal energy stored in the PCM 50 within the lid PCM pod 94 will be rejected back into, and absorbed by, the beverage, thereby heating the beverage to a temperature within the desired drinking temperature range (i.e., a temperature approximately equal to the melting temperature of the respective PCM 50) as the beverage is dispensed from the beverage reservoir 42.

Figure 6:
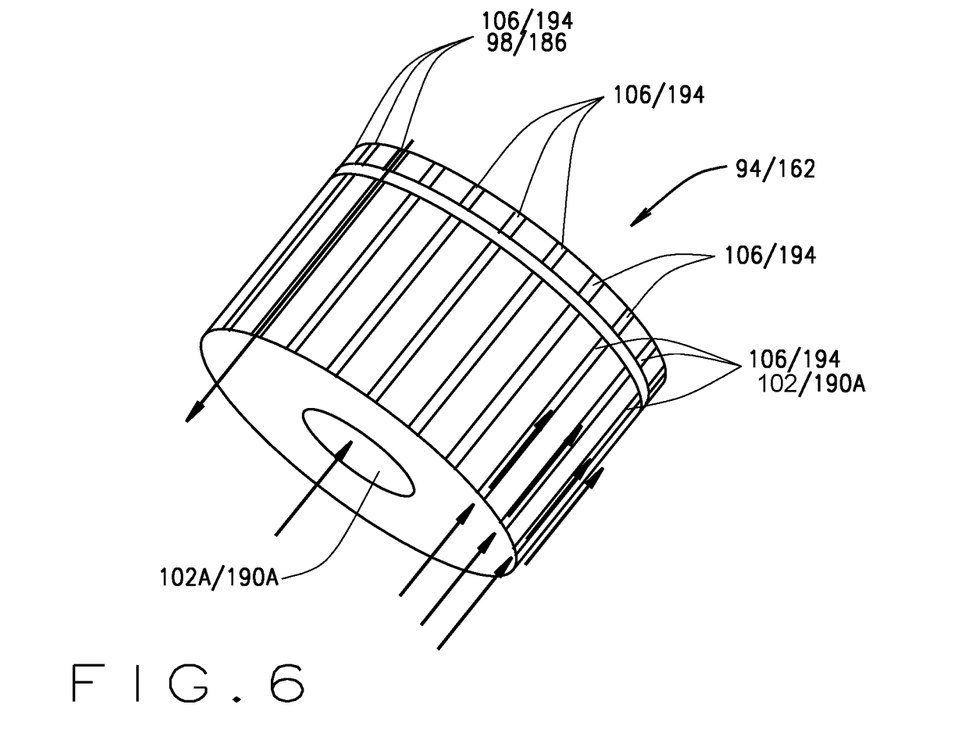
FIG. 6 is an isometric view of a lid PCM pod comprising a plurality of micro-channels, in accordance with various embodiments of the present disclosure.
Figure 7:
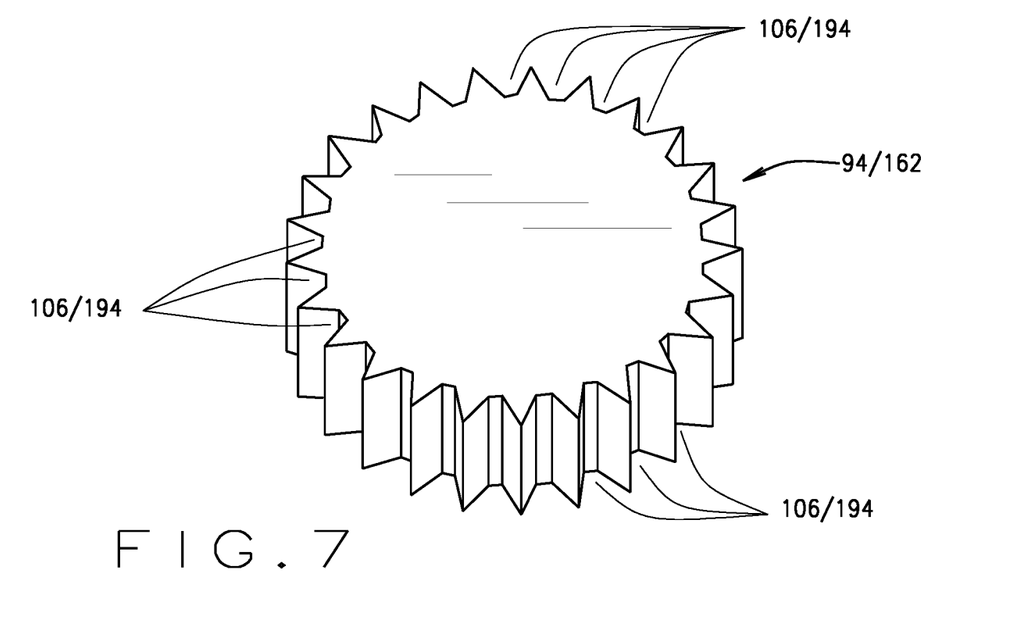
FIG. 7 is an isometric view of a lid PCM pod comprising a one or more micro-channels, in accordance with various other embodiments of the present disclosure.

Referring now to FIGS. 6 and 7, in various embodiments, the lid PCM pod 94 can comprise one or more (e.g., a plurality) of micro-channels 106 formed in and disposed around at least a portion of a perimeter side or edge of the lid PCM pod 94. In such embodiments, when the container system 10 is tilted to dispense the beverage from the beverage reservoir 42, a plurality of the micro-channels 106 will serve or function as liquid flow orifices 102 that are in fluid communication with the drinking hole 74, and similarly, a plurality of the micro-channels 106 will serve or function as air orifices 98 that are in fluid communication with the air hole 76 of the lid 58, as exemplarily illustrated in FIG. 6. Accordingly, once the thermal energy from hot beverage has been transferred the PCM 50 within the lid PCM pod 94 (as described above), as the beverage is dispensed or consumed, the beverage will flow through the micro-channels 106 serving as liquid flow orifices 102 (as indicated by the arrows) and subsequently flow through the drinking hole 74 in the lid base 66. As the beverage flows through the micro-channels/liquid flow orifices 106/102, the thermal energy stored in the PCM 50 within the lid PCM pod 94 will be rejected back into, and absorbed by, the beverage, thereby heating the beverage to a temperature within the desired drinking temperature range (i.e., a temperature approximately equal to the melting temperature of the respective PCM 50) as the beverage is dispensed from the beverage reservoir 42. Additionally, as the beverage is being dispensed through the micro-channels/liquid flow orifices 106/102, air will be drawn into the beverage reservoir 42 via the air hole 76 and the micro-channels/air orifices 106/98, thereby providing a smooth flow of the beverage through the micro-channels/liquid flow orifices 106/102.

More specifically, the PCM 50 within the lid PCM pod 94 with absorb, retain and reject heat from and to the beverage in the same manner as described above with regard to the PCM disposed within the PCM cavity 46 of the PCM liner 18. For example, when a hot liquid flows through the micro-channels/liquid flow orifices 106/102, heat is efficiently transferred from hot beverage to the PCM 50 within the lid PCM pod 94, and then subsequently back to the beverage, as described above with regard to the PCM disposed within the PCM cavity 46 of the PCM liner 18. Accordingly, the lid PCM pod 94 will help maintain approximately a uniform temperature throughout the beverage disposed within the beverage reservoir 42 from the top portion to the bottom portion of the liquid. For example, theoretical analysis, numerical modeling, and experimental data has exemplarily demonstrated that, via use of the lid PCM pod 94, the temperature difference between the top portion and bottom portion of the liquid can be reduced from approximately 18° F. (approximately 10° C.) (without the PCM lid pod) to approximately 1.8° F. (approximately 1.0° C.) (with the PCM lid pod) when a liquid having a temperature of approximately 212° F. (approximately 100° C.) is disposed within the center cavity.

The micro-channels 106 can have any desires shape and size (e.g., depth), and have any desired spacing around all or any one or more portion of the perimeter side/edge and remain within the scope of the present disclosure. In various embodiments, as exemplarily illustrated in FIG. 6, in addition to the micro-channels 106, the lid PCM pod can comprise a main liquid flow orifice, identified as 102A, that is also in fluid communication with the drinking hole 74. Accordingly, when the beverage is dispensed from the beverage reservoir 42, the beverage can flow through the main liquid flow orifice 102A and/or one or more of the micro-channels/liquid flow orifices 106/102, thereby heating the beverage to a temperature within the desired drinking temperature range (i.e., a temperature approximately equal to the melting temperature of the respective PCM 50) as the beverage is dispensed from the beverage reservoir 42.

Figure 8:
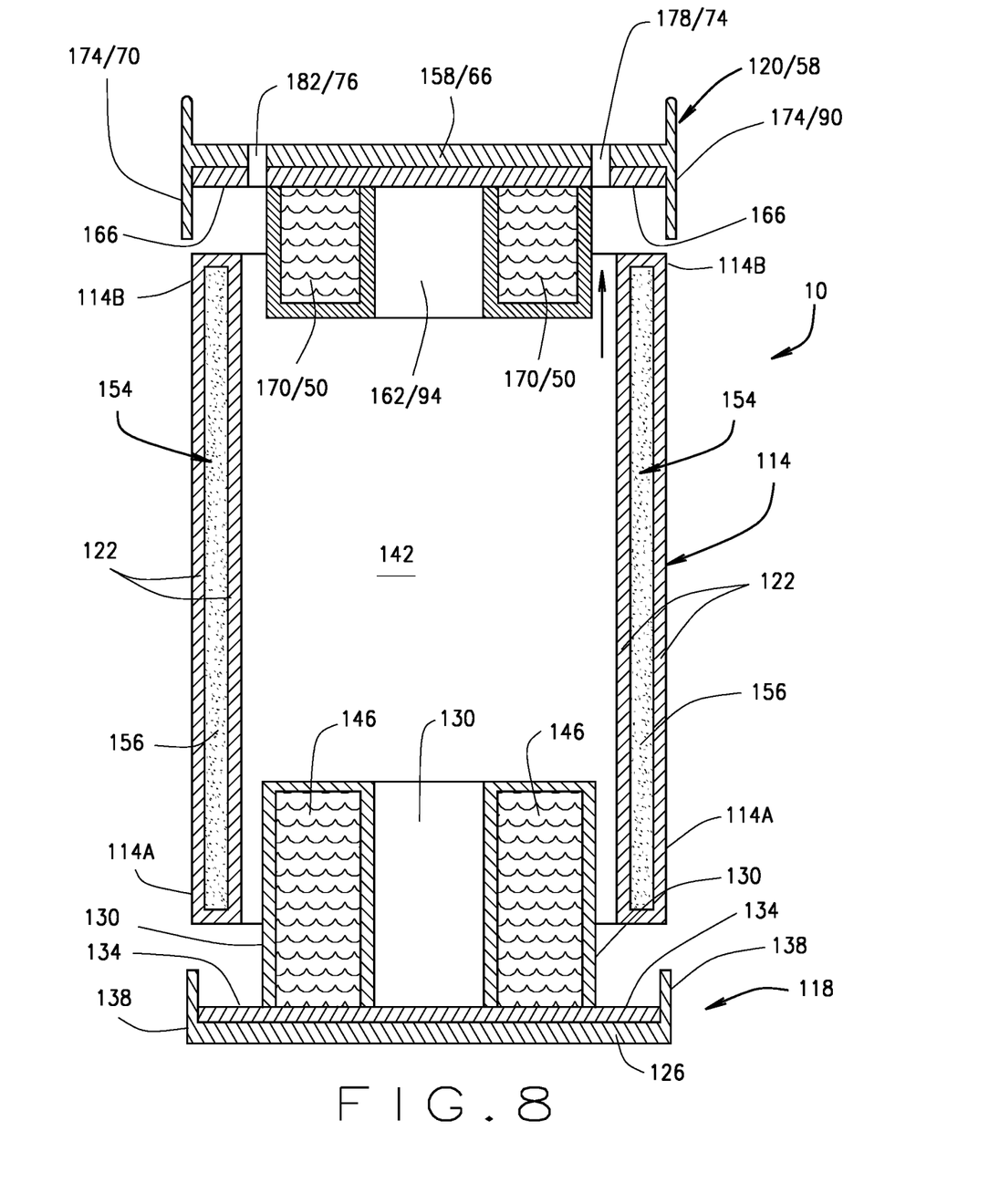
FIG. 8 is an exploded longitudinal cross-sectional view of the heat exchanging thermal liquid container system shown in FIG. 1 having a modular construction, in accordance with various embodiments of the present disclosure.

Referring now to FIG. 8, in various embodiments, the heat exchanging thermal liquid container system 10 of the present disclosure can be a modular system such that the container system 10 can be easily assembled and disassembly. Particularly, the container system 10 can be user configured to keep the beverage at generally any desired temperature for a long period of time (e.g., approximately 1 to 15 hours). In such modular embodiments, the container system 10 can comprise a tubular main body 114, at least one lower PCM unit 118 that is removably connectable to a first, or lower, end 114A of the main body 114, and at least one upper PCM unit 120 that is removably connectable to a second, or upper, end 114B of the main body 114. The main body 114 is a hollow tubular body having at least one sidewall 122. The sidewall 122 can be made of desired suitable material such stainless steel, polymer, plastic material, glass or other material that can hold liquid as a container. When the lower PCM unit 118 is removably connected to the main body 114, the lower PCM unit 118 and the tubular main body 114 define a beverage reservoir 142 suitable for retaining various hot and/or cold liquids and beverages (e.g., coffee, tea, hot chocolate, soda, beer, water, etc.). The main body 114 sidewall(s) 122 can be structured and formed to have generally any radial (or lateral) cross-sectional shape and to define the beverage reservoir 142 having generally any cross-sectional shape. For example, in various embodiments, the main body 114 sidewalls(s) 122 can be structured and formed to have a hollow cylindrical, square, oval, rectangular, triangular, etc., radial (or lateral) lateral cross-sectional shape, and the beverage reservoir 142 can have any similar or dissimilar cylindrical, square, oval, rectangular, triangular, etc., radial (or lateral) cross-sectional shape.

In various embodiments, the main body 114 sidewall 122 can be a hollow body structured and formed to include an interior hollow space that defines an insulation cavity 154 that can be at least partially filled with insulation 156. The insulation 156 can be any suitable insulation. For example, in various embodiments the insulation cavity 154 can be at least partially filled with any desired insulating material, gas or liquid, or can be absent a material, gas or liquid. For example, in various instances, the insulation cavity 154 can be absent or void of air, or mostly absent or void of air (e.g., a vacuum or reduced air), or in other instances the insulation cavity 154 can be at least partially filled with fiberglass, polystyrene, polyurethane foam, cellulose, mineral wool, or any other presently and future known insulation material. In such embodiments, the insulating function provided by the insulation 156 within insulation cavity 154 of the main body 114 will reduce and retard the rejection of thermal energy (e.g., heat loss) from a beverage disposed within the beverage reservoir 142 to the ambient environment.

Figure 9A:
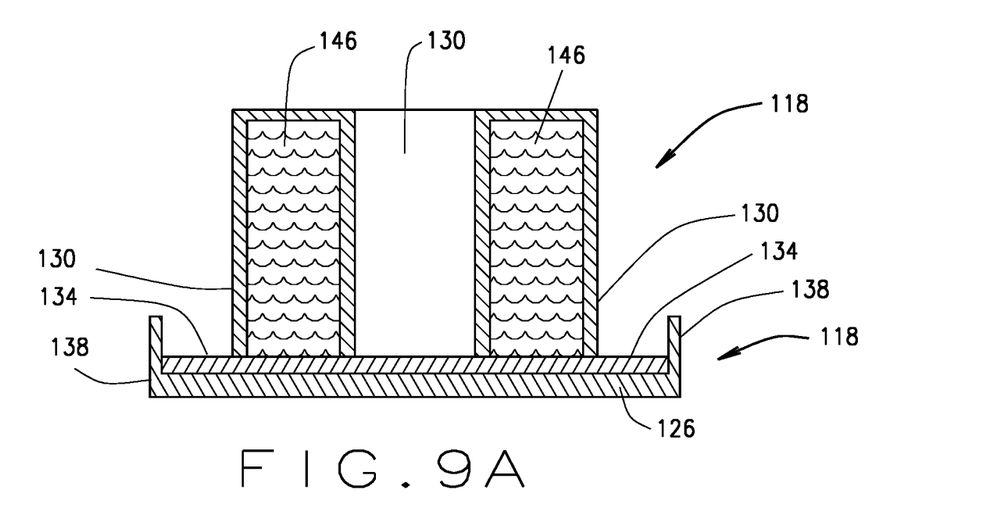
FIG. 9A is a longitudinal cross-sectional view of a lower PCM unit of the modular heat exchanging thermal liquid container system shown in FIG. 8, in accordance with various embodiments of the present disclosure.
Figure 9B:
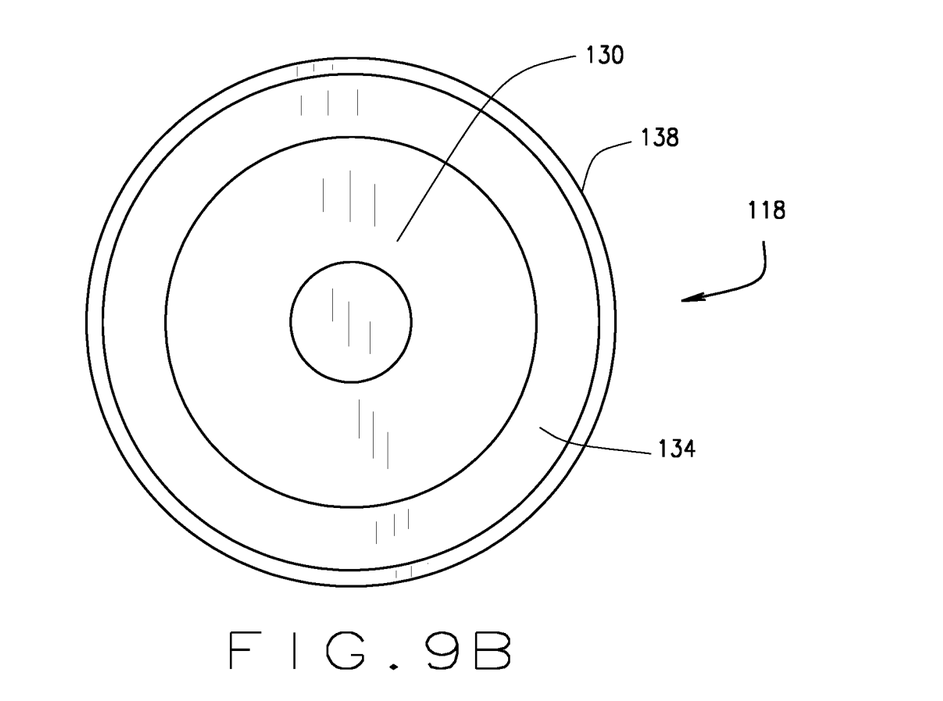
FIG. 9B is top view of the lower PCM unit shown in FIG. 9A, in accordance with various embodiments of the present disclosure.

Referring now to FIGS. 8, 9A and 9B, in various embodiments, the lower PCM unit 118 comprises a lower unit base 126, a lower PCM pod 130 that is fixedly or removably attached to, or extends from, or is disposed adjacent to a top surface of the lower unit base 126, and a lower unit seal 134. The lower unit PCM pod 130 can be any one or more reservoir, bladder, compartment, cavity, container, housing, or other hollow structure that can be at least partially filled with a lower unit PCM 146. The lower unit PCM 146 can be any PCM having any desired melting temperature. For example, if the container 10 is used for drinking coffee, the melting of the lower unit PCM 146 can be in the range of 130° F.-150° F. Or, if the container 10 is used for drinking beer, the melting temperature of the lower unit PCM 146 can be between 20° F. and 50° F. To removably connect the lower unit PCM unit 118 to the lower end 114A of the main body 114, the lower PCM unit 118 further comprises a connection or retention collar 138 that is integrally formed with or fixedly connected to a perimeter of the lower unit base 126 and extends from a top side of the lower unit base 126. The lower unit retention collar 138 is structured and operable to removably engage with the main body lower end 114A. When the lower unit retention collar is engaged with the container body lower end 114A the lower unit seal 134 is engaged, pinched, compressed or squeezed between the main body lower end 114A and the lower unit base 126 to provide a substantially liquid-tight seal between the main body lower end 114A and the lower unit base 126.

The lower unit retention collar 138 is structured and operable to removably engage with the main body lower end 114A in any suitable manner. For example, in various embodiments, the lower unit retention collar 138 can threadably engage the main body lower end 114A. Or, in other embodiments, the lower unit retention collar 138 can frictionally engage the main body lower end 114A, or snap-connect with the main body lower end 114A, or twist-lock connect with the main body lower end 114A, or any combination thereof. Although the lower unit retention collar 138 is exemplarily illustrated in FIGS. 8, 9A and 9B as removably engageable with the exterior surface of main body lower end 114A, it is envisioned that the lower unit retention collar 138 can be removably engageable with the interior surface of the main body lower end 114A, or removably engageable with the exterior and interior surface of the main body lower end 114A.

Figure 10A:
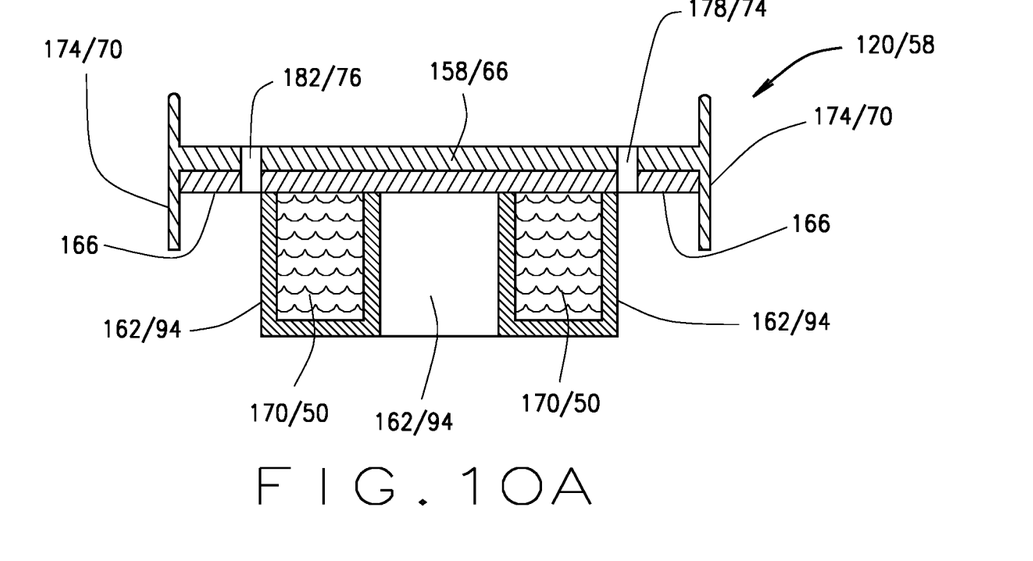
FIG. 10A is a longitudinal cross-sectional view of an upper PCM unit of the modular heat exchanging thermal liquid container system shown in FIG. 8, in accordance with various embodiments of the present disclosure.
Figure 10B:
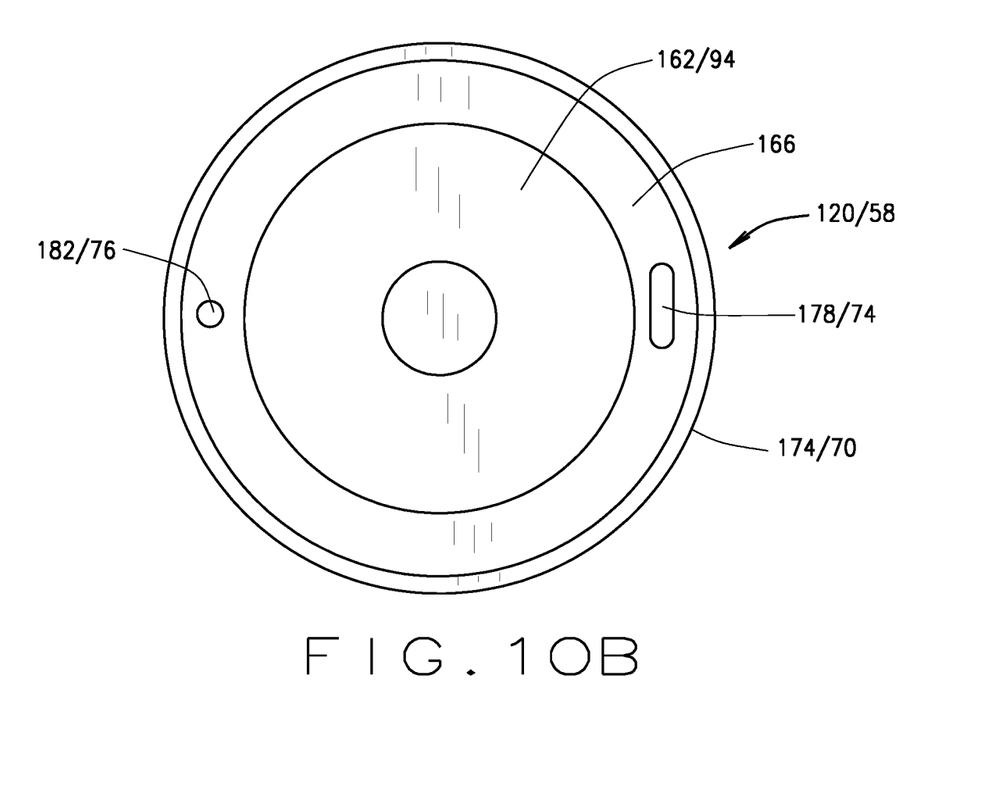
FIG. 10B is top view of the upper PCM unit shown in FIG. 10A, in accordance with various embodiments of the present disclosure.

Referring now to FIGS. 8, 10A and 10B, in various embodiments, the upper PCM unit 120 comprises an upper unit base 158, and an upper PCM pod 162 that is fixed or removably attached to, or extends from, or is disposed adjacent to, an underside or bottom surface of the upper unit base 158. In various instances, the upper PCM unit 120 can additionally include an upper unit seal 166. The upper unit PCM pod 162 can be any one or more reservoir, bladder, compartment, cavity, container, housing, or other hollow structure that can be at least partially filled with an upper unit PCM 170. The upper unit PCM 170 can be any PCM having any desired melting temperature. For example, if the container 10 is used for drinking coffee, the melting of the upper unit PCM 170 can be in the range of 130° F.-150° F. Or, if the container 10 is used for drinking beer, the melting temperature of the upper unit PCM 170 can be between 20° F. and 50° F. To removably connect the upper PCM unit 120 to the upper end 114B of the main body 114, the upper PCM unit 120 further comprises a connection or retention collar 174 that is integrally formed with or fixedly connected to a perimeter of the upper unit base 158 and extends from a bottom side of the upper unit base 158. The upper unit retention collar 174 is structured and operable to removably engage with the main body upper end 114B. In the instances wherein the upper PCM unit comprises the upper unit seal 166, when the upper unit retention collar 174 is engaged with the container body upper end 114B the upper unit seal 166 is engaged, pinched, compressed or squeezed between the main body upper end 114B and the upper unit base 158 to provide a substantially liquid-tight seal between the main body upper end 114B and the upper unit base 158.

The upper unit retention collar 174 is structured and operable to removably engage with the main body upper end 114B in any suitable manner. For example, in various embodiments, the upper unit retention collar 174 can threadably engage the main body upper end 114B. Or, in other embodiments, the upper unit retention collar 174 can frictionally engage the main body upper end 114B, or snap-connect with the main body upper end 114B, or twist-lock connect with the main body upper end 114B, or any combination thereof. Although the upper unit retention collar 174 is exemplarily illustrated in FIGS. 8, 10A and 10B as removably engageable with the exterior surface of main body upper end 114B, it is envisioned that the upper unit retention collar 174 can be removably engageable with the interior surface of the main body upper end 114B, or removably engageable with the exterior and interior surface of the main body upper end 114B.

In addition to the beverage heating (or cooling) functionality of the upper PCM unit 120, as described herein, the upper PCM unit 120 also provides and functions as a lid or cap of the system 10. As such, the upper PCM unit 120 is structured and operable to prevent and/or inhibit a beverage disposed within the beverage reservoir 142 from readily flowing or splashing out of the beverage reservoir 142, and to allow controlled dispensing of the beverage from the beverage reservoir 142. Accordingly, to allow controlled dispensing of the beverage from the beverage reservoir 142, the upper PCM unit 120 additionally includes a drinking hole 178 that extends through the upper unit base 158 such that the beverage within the beverage reservoir 142 can be controllably dispensed though the drinking hole 178 for consumption by a user. In various embodiments, the upper PCM unit 120 can further include an air hole 182 that extends through the upper unit base 158 such that air can be drawn into the beverage reservoir 142 as the beverage is dispensed through the drinking hole 178, thereby providing a smooth flow of the beverage through the drinking hole 178.

As described above, the lower unit and upper unit PCM pods 130 and 162 can be at least partially filled with any desired PCMs 146 and 170, each PCM respectively having any desired melting temperature. In various embodiments, the lower unit PCM 146 and the upper unit PCM 170 can have the same melting temperature, while in other embodiments, the lower unit PCM 146 and the upper unit PCM 170 can have the different melting temperatures. Hence, in various embodiments, the container system 10 can comprise a plurality of lower PCM units 118 and/or a plurality of upper PCM units 120, whereby the plurality of lower PCM units 118 are selectively interchangeable and the plurality of upper PCM units 120 are selectively interchangeable such that the heat exchanging thermal liquid container system 10 can be user configurable to provide any desired beverage (or other liquid) temperature control or maintenance. Particularly, the container system 10 can be user configured to keep the beverage within the beverage reservoir 142 at generally any desired temperature for a long period of time (e.g., approximately 1 to 15 hours). Alternatively, in various embodiments, the container system 10 can comprise a plurality of lower PCM pods 130 and/or a plurality of upper PCM pods 162 that are removably connectable to the respective lower and/or upper unit bases 126 and/or 158, whereby the plurality of lower PCM pods 130 are selectively interchangeable and the plurality of upper PCM pods 162 are selectively interchangeable such that the heat exchanging thermal liquid container system 10 can be user configurable to provide any desired beverage (or other liquid) temperature control or maintenance.

Although the upper unit PCM pod 162 is exemplarily illustrated in FIGS. 8, 10A and 10B to have a substantially annular lateral cross section, and to be disposed on underside of the upper unit base 158 such that air hole 178 in the upper unit base 158 aligns with a space between a peripheral sidewall of the upper unit PCM pod 162 and an interior surface of the main body sidewall 122, in various embodiments, the upper unit PCM pod 162 can have the same size, shape and/or configuration, and be disposed on or adjacent the underside of the upper unit base 158, as the various exemplarily embodiments of the lid PCM pods 94 described above and illustrated in FIGS. 1 through 7, or any combination thereof. That is, in various instances of such embodiments, as exemplarily illustrated in FIG. 4, the upper unit PCM pod 162 can comprise one or more air orifice 186 that fluidly connects with the air hole 182 in the upper unit base 158, and one or more liquid flow orifice 190 that fluidly connects to the drinking hole 178 in the upper unit base 158. Or, in various other instances of such embodiments, as exemplarily illustrated in FIGS. 5A and 5B, in various embodiments, the upper unit PCM pod 162 can comprise a primary liquid flow orifice, identified as 190A and at least one secondary liquid flow orifice, identified as 190B. Or, in yet various other instances of such embodiments, as exemplarily illustrated in FIGS. 6 and 7, the upper unit PCM pod 162 can comprise a one or more (e.g., a plurality) of micro-channels 194 disposed around a perimeter side or edge of the upper unit PCM pod 162.

In operation, when a beverage, e.g., a hot beverage such as coffee, is poured into or disposed within the beverage reservoir 142, the thermal energy (i.e., the heat) from hot beverage is transferred (i.e., rejected to and absorbed by) the lower unit PCM 146 and the upper unit PCM 170 (if the upper unit PCM pod 162 extends into the hot beverage) causing the lower unit PCM 146 and the upper unit PCM 170 (if the upper unit PCM pod 162 extends into the hot beverage) to change phase from a substantially solid form to a liquid form, whereby the lower unit PCM 146 and the upper unit PCM 170 (if the upper unit PCM pod 162 extends into the hot beverage) store(s) the thermal energy (i.e., the heat). Note that the lower PCM unit 118 and/or lower unit PCM pod 130 can be selected to have a lower unit PCM 146 having a first desired melting temperature, and similarly, the upper PCM unit 120 and/or upper unit PCM pod 162 can be selected to have an upper unit PCM 170 having a second desired melting temperature, wherein the first and second melting temperatures can be the same or different. For example, lower PCM unit 118 and/or lower unit PCM pod 130 can be selected by the user to have a lower unit PCM 146 having a first desired melting temperature that is greater than a desired drinking temperature range of the respective beverage (e.g., approximately 165° F. to 180° F., 74° C. to 82° C.), while the upper PCM unit 120 and/or upper unit PCM pod 162 can be selected by the user to have an upper unit PCM 170 having a second desired melting temperature that is within a desired drinking temperature range of the respective beverage (e.g., approximately 98° F. to 160° F., 37° C. to 71° C.).

Thereafter, when the temperature of the beverage in the beverage reservoir 42 changes, e.g., cools down, such that the temperature of the beverage is reduced to a temperature that is below the melting temperature of one or both of the lower and upper unit PCMs 146 and 170, the respective lower and/or upper unit PCM(s) 146 and/or 170 release(s) the thermal energy stored in the respective lower and/or upper unit PCM(s) 146 and/or 170 back into liquid. That is, the heat stored in the respective lower and/or upper unit PCM(s) 146 and/or 170 is rejected to and absorbed by the beverage, thereby heating the beverage to, or maintaining the beverage within, a particular desired temperature range, or at an approximately steady or constant temperature, during which the respective lower and/or upper unit PCM(s) 146 and/or 170 gradually change(s) from the liquid form back to the solid form. In this way, a hot beverage disposed within the beverage reservoir 142 can be quickly cooled down to be within the desired temperature range and maintained within the desired temperature range for many hours (e.g., approximately 1 to 15 hours).

Additionally, once the thermal energy from hot beverage has been transferred to the upper unit PCM 170 within the upper unit PCM pod 162 (as described above), and the beverage is dispensed or consumed such that the upper unit PCM pod 162 no longer extends into the beverage when the container 10 is a normal upright resting position, as the beverage is dispensed or consumed, the beverage will can flow (as indicated by the arrows) along the sidewall of the upper unit PCM pod 162 (in various embodiments, FIG. 8), or flow through the liquid flow orifice 190 of the upper unit PCM pod 162 (in various other embodiments, FIG. 4), or flow through the primary and/or secondary liquid flow orifices 190A and/or 190B of the upper unit PCM pod 162 (in yet various other embodiments, FIGS. 5A and 5B), or flow through one or more micro-channels 194 of the upper unit PCM pod 162 (in still yet various other embodiments, FIGS. 6 and 7), or any combination thereof. Accordingly, when the container system 10 is tilted to dispense the beverage from the beverage reservoir 142, and the beverage flows along the sidewall of the upper unit PCM pod 162, or through the liquid flow orifice 190 of the upper unit PCM pod 162, or through the primary and/or secondary liquid flow orifices 190A and/or 190B of the upper unit PCM pod 162, or through one or more micro-channels 194 of the upper unit PCM pod 162, or any combination thereof, the thermal energy stored in the upper unit PCM 170 within the upper unit PCM pod 162 will be rejected back into, and absorbed by, the beverage, thereby heating the beverage to a temperature within the desired temperature range (i.e., a temperature approximately equal to the melting temperature of the respective PCM 170) as the beverage is dispensed from the beverage reservoir 42.

As described above, the present disclosure provides the heat exchanging thermal liquid container system 10 that can be used to maintain and/or dispense a liquid, e.g., a consumable beverage, at or near the desired temperature range for an extended period of time (e.g., for approximately 1 to 15 hours). For example, the container system 10 can maintain and/or dispense a hot beverage at a desired temperature range of approximately 98° F. to 160° F., 37° C. to 71° C., and/or can maintain and/or dispense a cold beverage at a desired temperature range of approximately 32° F. to 50° F., 0° C. to 10° C. It should be noted that when used to maintain and/or dispense a cold beverage at a desired temperature range (e.g., when this container 10 is to be used for drinking beer), the entire container system 10, or one or more of the removable PCM component(s) (e.g., the lid PCM pod 94, and/or the PCM liner 18, and/or the upper unit PCM pod 162, and/or the lower unit PCM pod 130) can be removed and placed in a cool or cold environment (e.g., a refrigerator, freezer or ice water) such that the respective PCM(s) 50 and/or 170 and/or 146, selected to have a low melting temperature (e.g., a melting temperature of approximately 32° F. to 50° F., 0° C. to 10° C.), will absorb the cold thermal energy and change to a solid phase. Subsequently, when a user wishes to utilize the container system 10 for retaining one or more cold beverages (e.g., drinking beer), he/she can retrieve the container system 10 or the respective PCM component(s) (e.g., the lid PCM pod 94, and/or the PCM liner 18, and/or the upper unit PCM pod 162, and/or the lower unit PCM pod 130) from the cool/cold environment and assemble the container system 10 in any desired configuration.

Referring now to FIGS. 1 though 10B, it is envisioned that in various embodiments the heat exchanging thermal liquid container system 10 of the present disclosure can be configured and/or assembled to comprise any combination of the PCM liner 18 shown in FIGS. 1 through 4, and/or the lid assembly 58 and lid PCM pod 94 shown in FIGS. 4 through 7, and/or the lower PCM unit 118 and lower unit PCM pod 130 shown in FIGS. 8, 9A and 9B, and/or the upper PCM unit 120 and upper unit PCM pod 162 shown in FIGS. 4, 5A, 5B, 6, 7, 8, 9A and 9B, and remain within the scope of the present disclosure. Furthermore, it is envisioned that in various embodiments, the lower and/or upper PCM pods 130 and/or 162 can comprise a metal foil, heat sink, or heat pipe internally disposed therein to enhance heat transfer between the beverage and the respective lower unit and/or upper unit PCM(s) 146 and/or 170.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A heat exchanging thermal liquid container system, said system comprising:
    a main body at least partially defining a liquid reservoir structured and operable to retain a liquid;
    a phase change material (PCM) liner comprising a PCM liner PCM having a selected melting temperature;
    a lid assembly that is removably connectable to the main body: and
    an upper PCM pod disposed adjacent an underside of a base of the lid assembly and comprising an upper PCM pod PCM disposed within an internal cavity of the upper PCM pod having a respective selected melting temperature, the upper PCM pod further comprising a plurality of channels formed in and disposed around at least a portion of a peripheral sidewall of the upper PCM pod that defines the internal cavity and are fluidly connected to a drinking hole in the base of the lid assembly,
    wherein the PCM liner and the upper PCM pod are disposable within the liquid reservoir such that when a liquid is disposed within the liquid reservoir the liquid will contact at least one of the at least one of the PCM liner and the upper PCM pod such that thermal energy can be exchanged between the liquid and the respective at least one of the PCM liner PCM and the upper PCM pod PCM.

2. The system of claim 1, wherein the main body comprises at least one sidewall and a bottom that define a PCM liner receptacle, and the PCM liner comprises at least one sidewall and is structured to fit within the PCM liner receptacle, thereby defining the liquid reservoir.

3. The system of claim 1, wherein the upper PCM pod further comprises a primary liquid flow orifice that is fluidly connected to the drinking hole.

4. The system of claim 1, wherein the upper PCM pod is removably connectable to at least one of the lid assembly, the PCM liner and the main body, and wherein the upper PCM pod PCM selected melting temperature is a first selected melting temperature.

5. The system of claim 4 further comprising a lower PCM pod that is removably connectable to at least one of the PCM liner and the main body, the lower PCM pod comprising a PCM having a second selected melting temperature.

6. The system of 5, wherein the first selected melting temperature is different than the second selected melting temperature.

* * * * *